United States Patent
Jonchery et al.

(10) Patent No.: US 8,818,083 B2
(45) Date of Patent: Aug. 26, 2014

(54) SYSTEM OF DRONES PROVIDED WITH RECOGNITION BEACONS

(75) Inventors: Claire Jonchery, Paris (FR); Thomas Derbanne, Paris (FR); Martin Lefebure, Courbevoie (FR)

(73) Assignee: Parrot, Paris (FR)

( * ) Notice: Subject to any disclaimer, the term of this patent is extended or adjusted under 35 U.S.C. 154(b) by 595 days.

(21) Appl. No.: 13/132,149

(22) PCT Filed: Nov. 19, 2009

(86) PCT No.: PCT/FR2009/052218
§ 371 (c)(1),
(2), (4) Date: Aug. 24, 2011

(87) PCT Pub. No.: WO2010/063916
PCT Pub. Date: Jun. 10, 2010

(65) Prior Publication Data
US 2011/0299732 A1    Dec. 8, 2011

(30) Foreign Application Priority Data
Dec. 4, 2008   (FR) ..................................... 08 06800

(51) Int. Cl.
*G06K 9/00*   (2006.01)

(52) U.S. Cl.
USPC .......................................... 382/162; 382/103

(58) Field of Classification Search
USPC .................................. 382/103, 162, 165, 287
See application file for complete search history.

(56) References Cited

U.S. PATENT DOCUMENTS

| | | | |
|---|---|---|---|
| 6,453,055 B1 | 9/2002 | Fukumura et al. | |
| 7,302,093 B2 * | 11/2007 | Dorrance et al. | 382/162 |
| 2002/0041705 A1 * | 4/2002 | Lin et al. | 382/165 |
| 2005/0026689 A1 | 2/2005 | Marks | |
| 2005/0147302 A1 * | 7/2005 | Leung | 382/190 |
| 2008/0056535 A1 * | 3/2008 | Bergmann et al. | 382/103 |
| 2009/0092338 A1 * | 4/2009 | Achong | 382/300 |

FOREIGN PATENT DOCUMENTS

| | | |
|---|---|---|
| FR | 2912318 A1 | 8/2008 |
| GB | 2306834 A | 7/1995 |
| JP | 2004185630 A | 7/2004 |
| JP | 2008161425 A | 7/2008 |

\* cited by examiner

*Primary Examiner* — John Strege
(74) *Attorney, Agent, or Firm* — Haverstock & Owens LLP

(57) ABSTRACT

The present invention relates to a system (1) of remotely controlled drones (10, 12) fitted with respective cameras (14) enabling a virtual shot from an assailant drone (12) at a target drone (10) to be validated by recognizing the target drone (10) in a video image (17) supplied by the camera (14) of the assailant drone (12) while firing a virtual shot. The recognition means comprise a beacon (15, 16) arranged on the target drone (10) and covered in two first strips (18) of a first color reflecting light at a first wavelength lying in the range 590 nm to 745 nm, situated on either side of at least one second strip (19, 20) of a second color reflecting light at a second wavelength, lying in a range 445 nm to 565 nm. It is thus possible to identify very reliably drones flying in an open space whether outdoors or indoors, in spite of the very great variety of interfering details present in the background images that are likely to be picked up by the camera.

13 Claims, 2 Drawing Sheets

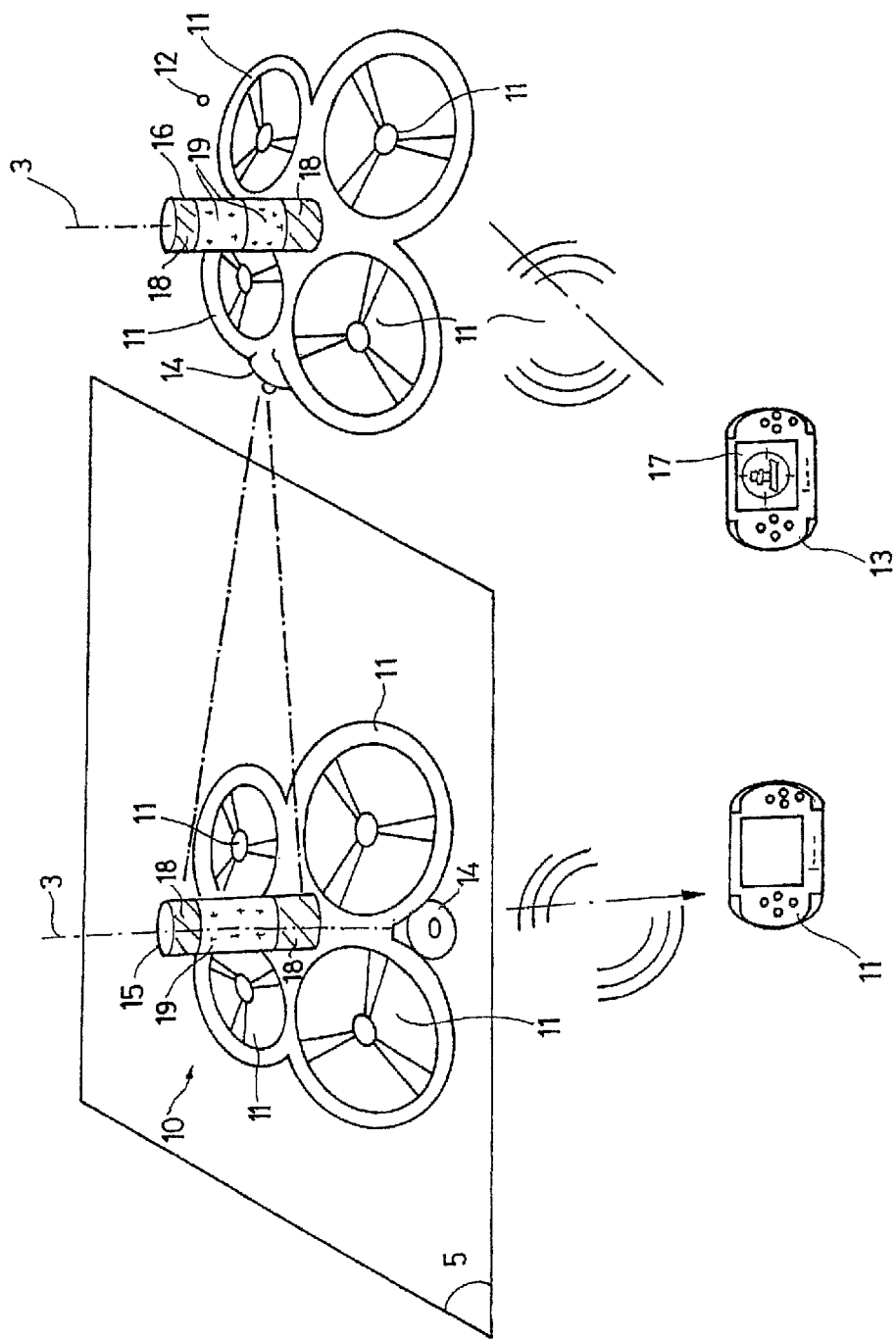
FIG_1

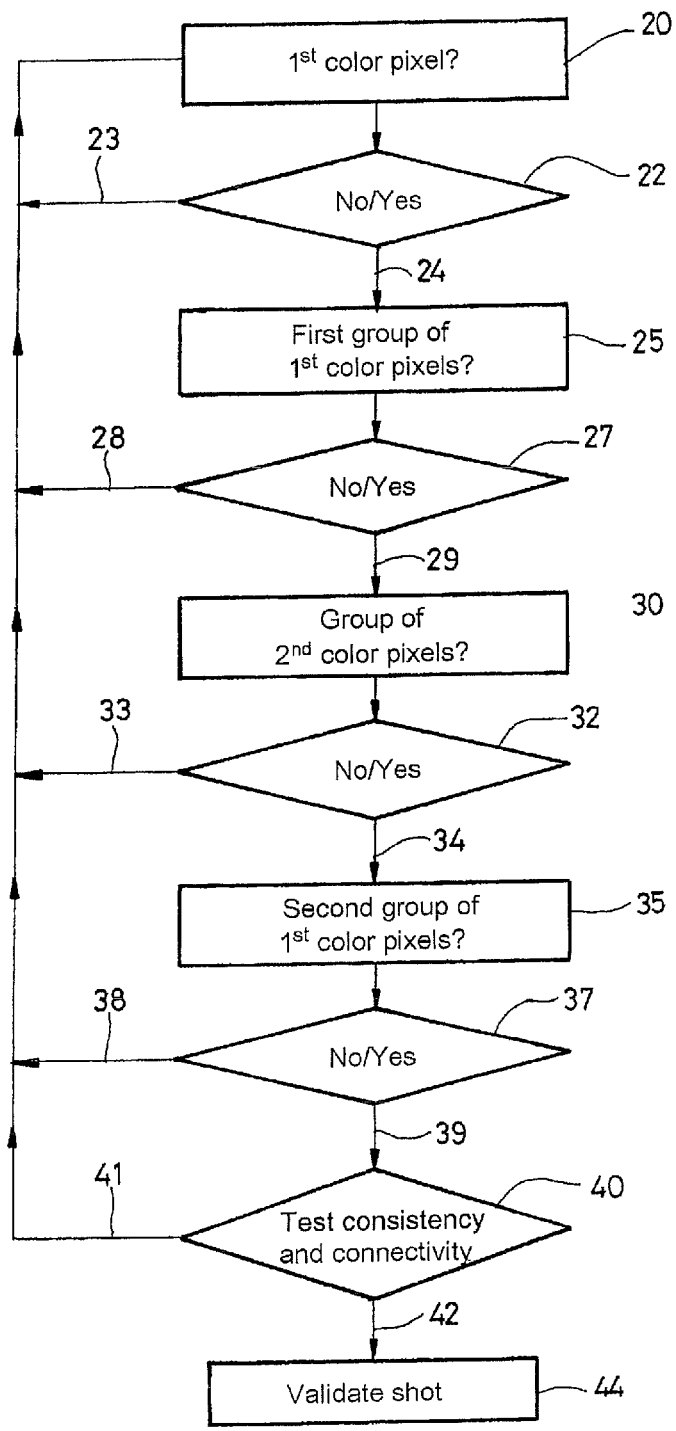

SYSTEM OF DRONES PROVIDED WITH RECOGNITION BEACONS

The present invention relates to a system of drones provided with recognition beacons.

A particularly advantageous application of the invention lies in the field of radio-controlled drones.

A drone is a flying machine that is remotely piloted by means of radio control. Certain drones are said to be rotary-wing drones and they may be using any known helicopter configuration.

It is known that radio-controlled toys may be provided with virtual shot generators, e.g. for the purpose of reproducing combat. Under such circumstances, it is necessary to evaluate each virtual shot fired by an assailant toy at a target toy in order to determine how the game progresses.

For this purpose, it is also known to provide such toys with cameras that stimulate sights associated with the virtual shot generators. Thus, a virtual shot fired by an assailant toy is considered as hitting a target toy if the target toy is detected in an image provided by the camera of the assailant toy while firing the virtual shot.

In order to detect a target automatically in an image, it is possible to use a method of recognizing shapes and/or characteristic points of the target toy.

Such a method is described for example in the article by L. Younes "Invariance, déformations et reconnaissances de formes" [Invariance, deformation, and shape recognition], published in Collection Mathématiques et Applications, Vol. 44, Springer 2004.

JP 2008-161425 A describes a toy having such shape recognition means for identifying a target in an image acquired by a camera.

Nevertheless, that technique requires significant calculation capacity and it may be difficult to implement with certain drones of shape that is relatively simple and unremarkable. As a result, such a virtual shot detector cannot be fitted on board a drone without making it much more expensive.

A second method, described for example in FR 2 912 318 A1 (Parrot SA) uses light-emitting diodes (LEDs) arranged on the drone in order to make it easier to recognize in an image, using characteristics that are specific to said LEDs, such as their rate of flashing.

However, recognizing the light from an LED, which in practice means recognizing a red spot surrounded by a white halo, is made difficult by large variations in luminosity as can occur, for example, when the drone changes its angle of exposure to the sun and/or to a source of artificial light. Large changes of luminosity generate false recognitions of LEDs such that virtual shots are validated even though no target drone was present in the sights of the assailant drone.

U.S. Pat. No. 6,453,055 B1 and JP 2004-185630 A describe a system of robots moving on a playground, each robot being identified by a colored ball or roundel having parallel strips of different colors, with unique color coding for each robot. A camera looking down on the playground analyzes the image of the scene, identifies the robots by a color recognition system, and deduces therefrom the position of each robot on the playground.

That technique is effective in the context under consideration, i.e. a plane playground of determined shape and size, viewed overall by a camera whose field of view covers the entire surface of the playground. Since the background is uniform, it is relatively easy to recognize the robots that are to be found thereon, so as subsequently to identify them by analyzing the color pattern carried by each of them.

However, with drones flying in open space, whether outdoors or indoors, the very wide variety of background images that might be picked up by a camera constitutes considerable disturbance for recognizing colors. Not only does the image have an indoor or outdoor background that includes numerous disturbing details and very strong and variable contrast differences, but the image is also very complex and changeable in colorimetric terms, both outdoors (trees and lawns, sky, vehicles, buildings or other objects in the background, . . . ) and indoors (lighting with a warmer or cooler color temperature, colors of furniture and wall and ground coverings, . . . ).

One of the objects of the invention is to provide a drone recognition system enabling the drones to be detected with a high degree of reliability in images taken by their on-board cameras in order to validate virtual shots fired between them, and to do so in environments that may be very different and that may contain multiple elements that are likely to disturb recognition.

To this end, the present invention provides a system of remotely-controlled drones fitted with respective cameras enabling a virtual shot from an assailant drone at a target drone to be validated by recognizing the target drone in a video image supplied by the camera of the assailant drone while firing a virtual shot, the system being characterized in that the recognition means comprise a beacon arranged on the target drone and covered in two first strips of a first color reflecting light at a first wavelength lying in the range 590 nanometers (nm) to 745 nm, situated on either side of at least one second strip of a second color reflecting light at a second wavelength lying in a range 445 nm to 565 nm.

A system of drones, each having such a beacon, enables shots to be validated easily and simply in a video image, while also ensuring that such validation is very reliable. Arranging a beacon covered in strips of different colors on a drone associates the drone with a pattern that is simply and quickly detectable. In addition, having two strips of a first color bracketing an intermediate second strip of a second color enables a drone to be associated with a specific alternation of strips such that in the event of detection it is possible to identify which drone has been detected.

In particular, it is possible very reliably to identify drones flying in an open space, whether outdoors or indoors, in spite of the very wide variety of disturbing details present in the background images that are likely to be picked up by the camera.

In one embodiment, the beacon is cylindrical in shape. Under such circumstances, the axis of the cylindrical beacon is perpendicular to a main plane of the target drone.

In one embodiment, the strips extend circumferentially over the surface of the beacon in mutually coplanar planes that are perpendicular to the axis of the cylinder.

In one embodiment, the first color of the two first strips is fluorescent.

In one embodiment, the beacon presents at least two second strips.

In one embodiment, the assailant drone includes means for analyzing the image taken while firing a virtual shot that implement the following means:

means for detecting a first pixel of the first color in the image;
means for detecting a first group of pixels of said first color including the previously-detected pixel;
means for detecting a group of pixels of the second color in the vicinity of the first group of pixels of the first color;
means for recognizing a second group of pixels of the first color; and means for verifying recognition and consistency conditions amongst the detected groups of pixels.

Under such circumstances, the means for verifying the recognition and consistency conditions of the groups of pixels may include at least:

means for verifying horizontal connectivity of the groups of pixels; and means for verifying vertical semi-connectivity of the groups of pixels, such that a row of pixels belonging to no group is acceptable between the different groups.

It is also possible for the means for verifying the recognition and consistency conditions of the groups of pixels to include at least:

means for analyzing luminance variation for each group of pixels;

means for analyzing the chrominance difference between the first strips of the first color and the second strip of the second color in a V image coding channel (red);

means for analyzing the chrominance difference between the two first strips of the first color in a U image coding channel (blue); and means for analyzing the minimum chrominance of the two first strips and of the second strip(s).

The invention also provides a drone provided with a camera enabling a virtual shot at a target drone to be validated by recognizing the target drone in a video image supplied by its camera while firing the virtual shot, the drone being characterized in that it includes recognition means enabling it to be used in a system in accordance with one of the above embodiments as a target drone and as an assailant drone.

The invention also provides a method of recognizing a remotely-controlled drone used in a system in accordance with one of the above embodiments.

There follows a description of an embodiment of the invention given with reference to the accompanying figures, in which:

FIG. 1 shows a drone game system in accordance with the invention; and

FIG. 2 is a diagram representing a method of detecting a drone provided with a beacon in accordance with the invention.

With reference to FIG. 1, a system 1 in accordance with the invention comprises drones 10 or 12 (FIG. 1) typically constituted by flying machines of small dimensions. In this preferred embodiment, the drones 10 and 12 are "quadricopters", i.e. rotary wing devices each having four rotors 11.

Each of the drones 10 and 12 is fitted with a camera 14 that transmits images to respective radio-controllers 11 and 13 that display the images on their respective screens.

By means of the screens, the users can view the movements of their drones and/or trigger a virtual shot when a target drone appears to enter into the sights of their own assailant drone, said sights being simulated by the camera 14.

In order to verify that a virtual shot from an assailant drone did indeed take place when the target drone was in the sights, it is necessary to determine automatically whether the target drone was present in the image 17 as displayed while firing the shot.

To do this, and in accordance with the invention, the drones 10 and 12 are fitted with respective beacons 15 and 16 that are easily detected in the images generated by the cameras 14.

By way of example, the beacons 15 and 16 may be cylindrical in shape, each presenting an axis 3 perpendicular to its main plane 5. The beacons 15 and 16 are covered by two first strips 18 surrounding at least one second strip 19 of a second color that is different from the color of the first strips 18.

The first color of the first strips 18 is typically a warm color such as orange, with radiation from said color having a wavelength lying in the range 590 nm to 745 nm. Such an orange color facilitates recognizing the beacon in an image since it is a color that is relatively unusual, and particularly outdoors, whether in an urban area or a rural area.

In contrast, the second color of the second strip 19 is typically blue ($\lambda$ generally lying in the range 445 nm to 490 nm) or green ($\lambda$ generally lying in the range 520 nm to 565 nm). Recognizing the beacon in an image is then facilitated by the presence of at least two color alternations between the first strips and the second strip.

This particular color contrast, characteristic of the invention, has been found to be particularly unusual in multiple environments that the inventors have tested, whether indoors or outdoors. This makes it possible to ensure that drones are recognized in extremely reliable manner, in spite of the color complexity of the background images that might be picked up by the camera.

Recognizing the beacon 15 or 16 requires said double alternation to be identified in an image.

Nevertheless, when more than two drones might be taken as targets for an assailant drone, it is preferable to use a beacon that presents at least two second strips 19 and 19', as shown on the beacon 16.

Under such circumstances, different color alternations may serve to identify different drones. For example, considering a game having four drones, the beacons associated with each drone may present two first strips that are orange while the second strip may present, for each drone, a specific combination of strips that are blue, green, or orange: blue/blue; green/green; green/orange; or orange/green (when a second strip is orange, then the device needs to take the heights of the respective strips into consideration).

As mentioned above, color recognition can be made difficult by large variations in luminosity. In order to limit the impact of variations in luminosity, the color strips implemented in this embodiment of the invention are fluorescent, thereby generally ensuring a high level of luminosity for the beacon.

It is relatively easy to recognize a drone having a beacon in accordance with the invention, such that the drones may carry on board the means needed for analyzing the images delivered by the camera 14.

In order to recognize a beacon 15 in the image 17 taken while firing a virtual shot from the assailant drone 12 at the target drone 10, a method in accordance with the invention begins by searching for the color orange in the image 17.

The principle on which a target is recognized consists in scanning the image looking for a first pixel of the first color that might correspond to the image of one of the two end strips 18 of the beacon.

This search may be performed using pixel coding in the image 17 based on signals complying with the YUV model in which colorimetric space is defined by three components:

a first component Y representing luminance; and two second components UV representing chrominance.

Information relating to chrominance suffices for characterizing a color even though information relating to luminance varies a great deal as a function of the illumination of the scene.

That is why the search for a color in an image is performed using only information relating to the chrominance of the pixels, thus making it possible to reduce the quantity of information that needs to be processed, particularly since the bandwidth required for transmitting this information is only one-quarter the bandwidth required for transmitting information relating to luminance.

Thus, the search for colors, defined as rectangles in UV space is very fast. Color characterization may be performed from a database, itself generated from target images under different conditions of luminosity. For example, in an embodiment of the invention, green is characterized by the following values in the chrominance channels: 79<U<120 and 34<V<115, and orange by the values: 65<U<146 and 159<V<252.

With reference to FIG. 2, a first step 20 represents the active state of the recognition means that analyze each delivered image 17 constantly in order to detect an orange pixel in the image.

This search may be performed by scanning the image along a spiral.

If a game is being played with more than two drones, it is more advantageous to use linear scanning of the image, from the top left corner to the bottom right corner in order to determine the height of the color strip, which heights are useful for distinguishing the orange and green beacons as described above.

As a function of the result 22 of this search, the spiral scan of the image is maintained by a command 23 so long as an orange pixel is not recognized.

Else, in the event of an orange pixel being recognized, the search 25 for a first group of orange pixels is instigated by a signal 24.

This search 25 for a group of orange pixels is performed in the vicinity of the initially detected orange pixels.

As a function of the result 27 of this search 25, a return 20 to a spiral scan of the image may be instigated by a signal 28 if no group of orange pixels is detected.

However a group of orange pixels may be detected, in which case a search 30 for a second group of pixels is instigated by a signal 29.

More precisely, a search is made for the second group on the basis of a color criterion corresponding to the potential second color of the intermediate strip 19 or 19'.

Depending on the result 32 of this search for a group of pixels having the second color, a return to a spiral scan of the image may be instigated by a signal 33 in the absence of such a second group of pixels.

Where appropriate, a search 35 for a potential second group of orange pixels is instigated by a signal 34.

As a function of the result 37 of this search 35, a return to a spiral scan of the image may be instigated by a signal 38 if no second group of orange pixels is detected.

Where appropriate, a second group of orange pixels is detected, and then conditions of connectivity and consistency of the three detected groups of pixels are verified 40, as instigated by a signal 39.

More precisely, connectivity conditions require horizontal connectivity and vertical semi-connectivity for the groups of pixels. Thus, it is acceptable for a row of pixels that do not belong to any detected group to be present between the various groups.

This semi-connectivity can be explained by using color rectangles for detecting the strips of the beacon. These rectangles may exceed the real size of the strip as displayed on the image and generate junction lines that are not necessarily connected.

Furthermore, consistency conditions seek to take into consideration variations in luminosity under which colors such as orange and green can vary significantly. For example, an orange strip may take on pinkish, reddish, or brownish coloring as a function of its illumination.

That is why the consistency conditions are as follows:
little variation in mean luminance between the groups of pixels (variation of luminance between two groups less than 60, for example);
strong difference in chrominance between the strips of the first color and the intermediate strip of the second color in the V channel (red), e.g. greater than a threshold (58 in one embodiment);
little difference in chrominance between two strips of the first color in the U channel (blue) (difference less than 45, for example); and
at least some minimum value of mean chrominance in the V channel (red) for the two first strips (greater than 167).

When the result 40 of this verification satisfies the conditions of connectivity and of consistency, a signal 42 indicates that recognition is validated 44. Otherwise, a signal 41 leads to a return to a spiral scan of the image.

In practice, an embodiment of the invention has been implemented with video cameras 14 using quarter common intermediate format (QCIF) type image resolution, each image being constituted by 144 rows of pixels ordered in 176 columns, and operating at a rate of 15 images per second.

Thus, the on-board image processor means have a period of the order of 60 milliseconds (ms) for detecting the presence of a beacon 15 in an image, which can be achieved with means that are relatively simple and of low cost.

In order to ensure that beacons are recognized reliably, the sensitivity threshold specific to each of the extreme strips 18 is one chrominance pixel, and four luminance pixels per image, which, given the simple means available on board the drones, makes it possible to detect a beacon having a height of 7.5 centimeters (cm) and a diameter of 5.2 cm at a distance of up to 2 meters (m) with strips each having a height of 2.5 cm.

The present invention may be varied in numerous ways. In particular, it is possible to analyze an image 17 using other approaches, e.g. by processing the image in blocks of eight pixels such that the image is analyzed progressively while it is being acquired.

The invention claimed is:

1. A system (1) of remotely controlled drones (10, 12) fitted with respective cameras (14) enabling a virtual shot from an assailant drone (12) at a target drone (10) to be validated by recognizing the target drone (10) in a video image (17) supplied by the camera (14) of the assailant drone (12) while firing a virtual shot, the system being characterized in that the recognition means comprise a beacon (15, 16) arranged on the target drone (10) and covered in two first strips (18) of a first color reflecting light at a first wavelength, situated on either side of at least one second strip (19, 20) of a second color reflecting light at a second wavelength, different from the first;

in that the emission spectrum of the first color of the two first strips (18) lies in the range 590 nm to 745 nm, while the emission spectrum of at least one second strip (19, 20) lies in the range 445 nm to 565 nm, and the assailant drone comprising means for analyzing the image taken while firing a virtual shot that comprises the following means:

means for detecting a first pixel of the first color in the image;

means for detecting a first group of pixels of said first color including the previously-detected pixel;

means for detecting a group of pixels of the second color in the vicinity of the first group of pixels of the first color;

means for recognizing a second group of pixels of the first color; and means for verifying recognition and consistency conditions amongst the detected groups of pixels.

2. A system according to claim 1, characterized in that the beacon (15, 16) is cylindrical in shape.

3. A system according to claim 2, characterized in that the axis (3) of the cylindrical beacon (15, 16) is perpendicular to a main plane (5) of the target drone.

4. A system according to claim 3, characterized in that the first strips (18) and at least one of the second strips (19, 20) extend circumferentially over the surface of the beacon (15, 16) in mutually coplanar planes that are perpendicular to the axis (3) of the cylinder.

5. A system according to claim 1, characterized in that the first color of the two first strips (18) is fluorescent.

6. A system according to claim 1, characterized in that the beacon (16) presents at least two second strips (19, 20).

7. A system according to claim 1, characterized in that the means for verifying the recognition and consistency conditions of the groups of pixels include at least:

means for verifying horizontal connectivity of the groups of pixels; and means for verifying vertical semi-connectivity of the groups of pixels, such that a row of pixels belonging to no group is acceptable between the different groups.

8. A system according to claim 1, characterized in that the means for verifying the recognition and consistency conditions of the groups of pixels include at least:

means for analyzing luminance variation for each group of pixels;

means for analyzing the chrominance difference between the two first strips of the first color and the at least one second strip of the second color in a V image coding channel (red);

means for analyzing the chrominance difference between the two first strips of the first color in a U image coding channel (blue); and means for analyzing the minimum chrominance of the two first strips and of the second strip(s).

9. A drone (10, 12) provided with a camera (14) enabling a virtual shot at a target drone (10) to be validated by recognizing the target drone (10) in a video image (17) supplied by its camera (14) while firing the virtual shot, the drone being characterized in that it includes recognition means enabling it to be used (12) in a system as a target drone (10) and as an assailant drone (12), the system being characterized in that the recognition means comprise a beacon (15, 16) arranged on the target drone (10) and covered in two first strips (18) of a first color reflecting light at a first wavelength, situated on either side of at least one second strip (19, 20) of a second color reflecting light at a second wavelength, different from the first;

in that the emission spectrum of the first color of the two first strips (18) lies in the range 590 nm to 745 nm, while the emission spectrum of at least one second strip (19, 20) lies in the range 445 nm to 565 nm, and the assailant drone comprising means for analyzing the image taken while firing a virtual shot that comprises the following means:

means for detecting a first pixel of the first color in the image;

means for detecting a first group of pixels of said first color including the previously-detected pixel;

means for detecting a group of pixels of the second color in the vicinity of the first group of pixels of the first color;

means for recognizing a second group of pixels of the first color; and means for verifying recognition and consistency conditions amongst the detected groups of pixels.

10. A system according to claim 7, characterized in that the means for verifying the recognition and consistency conditions of the groups of pixels include at least:

means for analyzing luminance variation for each group of pixels;

means for analyzing the chrominance difference between the two first strips of the first color and the at least one second strip of the second color in a V image coding channel (red);

means for analyzing the chrominance difference between the two first strips of the first color in a U image coding channel (blue); and means for analyzing the minimum chrominance of the two first strips and of the second strip(s).

11. A system according to claim 4, characterized in that the first color of the two first strips (18) is fluorescent.

12. A system according to claim 4, characterized in that the beacon (16) presents at least two second strips (19, 20).

13. A system according to claim 5, characterized in that the beacon (16) presents at least two second strips (19, 20).

* * * * *